Figure 1:
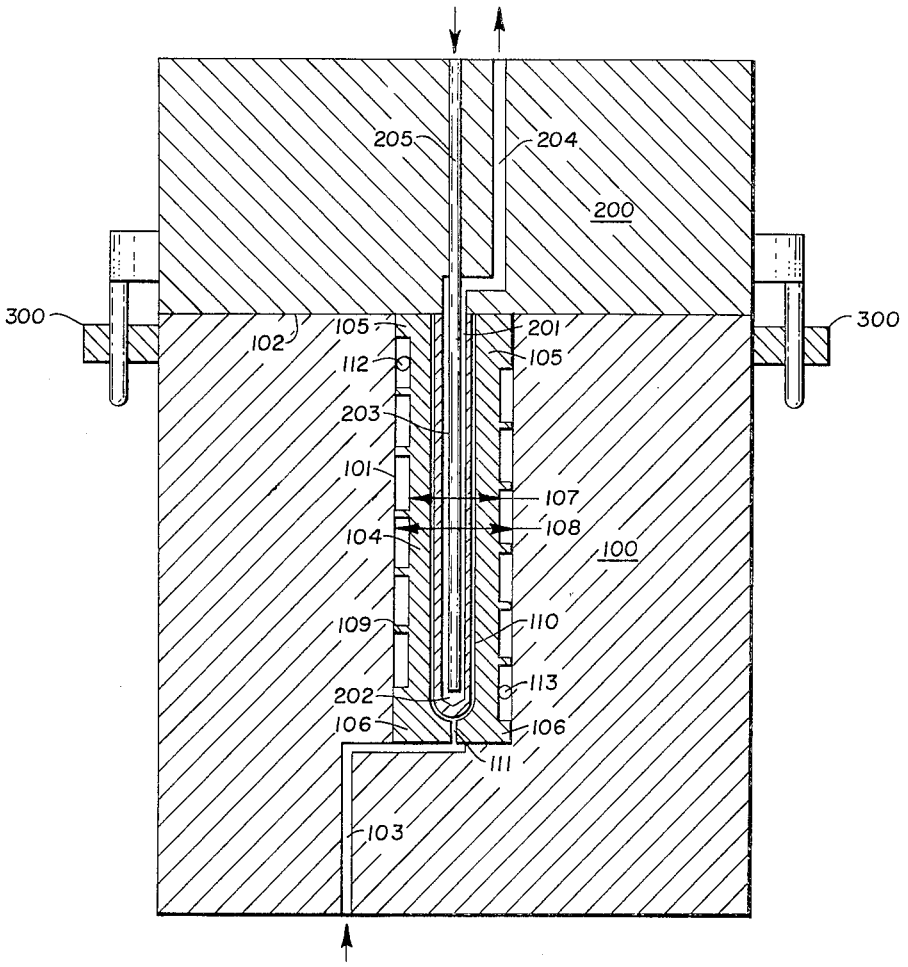

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 9

T949,004

METHOD AND APPARATUS FOR MOLDING POLY (ETHYLENE TEREPHTHALATE) PARISONS

Gerard V. Delaire, Rte. 1, Beverly, Apt. 9 37660, and Edward R. Hollander, Jr., Rte. 13, 213 Montezuma 37664, both of Kingsport, Tenn.

Filed May 14, 1975, Ser. No. 577,487
**Int. Cl.[2] B29C *17/07;* B29F *1/00***
U.S. Cl. 264—328
1 Sheet Drawing. 8 Pages Specification

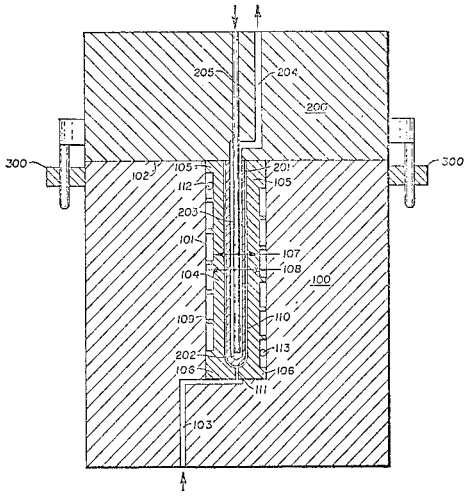

Disclosed is a method and apparatus for molding poly (ethylene terephthalate) parisons wherein helical flights are disposed within a cooling fluid annulus surrounding the parison mold causing the cooling fluid to be helically transported through the cooling fluid annulus.

G. V. DELAIRE et al.
METHOD AND APPARATUS FOR MOLDING POLY (ETHYLENE TEREPHTHALATE) PARISONS
Original Filed May 14, 1975